May 26, 1931. L. FLAMMA 1,807,518
COMBINATION BEVERAGE DISPENSER
Filed May 31, 1930  2 Sheets-Sheet 1
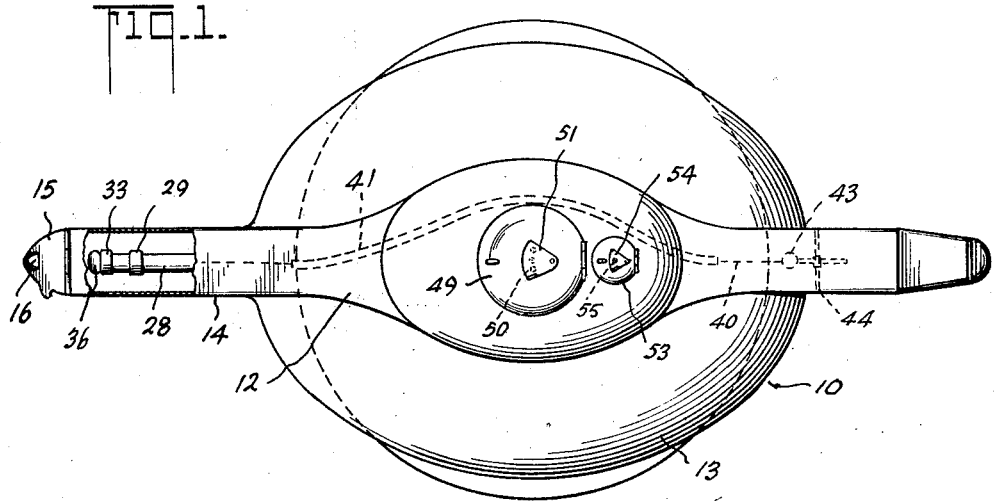
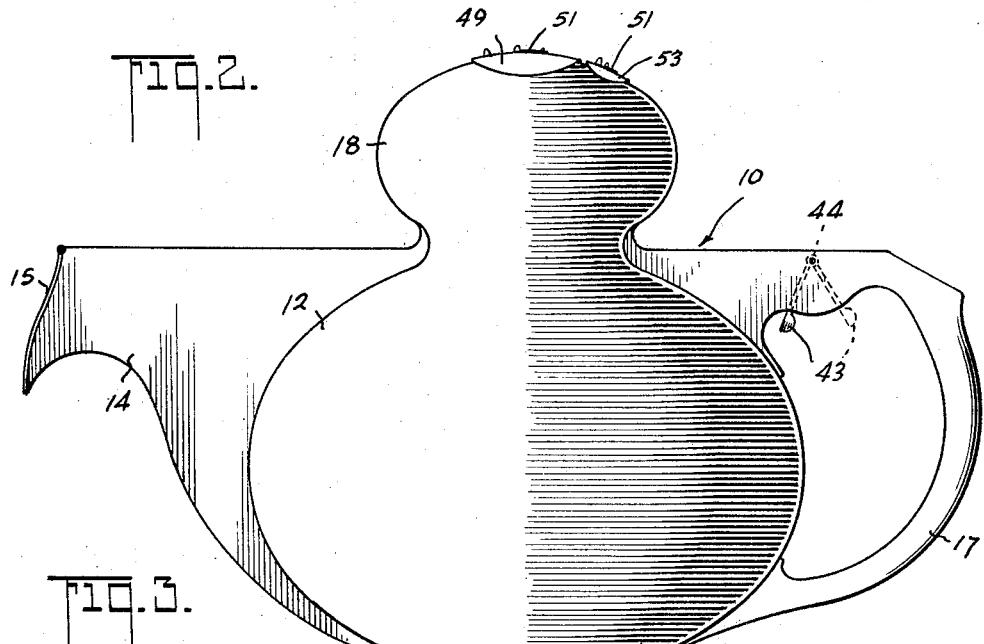
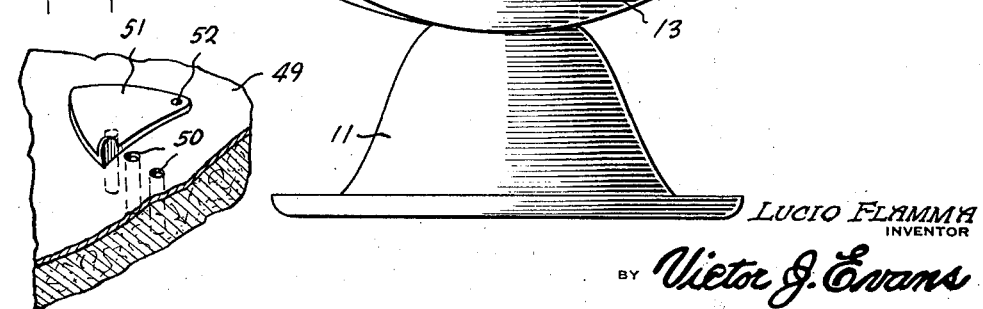
LUCIO FLAMMA
INVENTOR

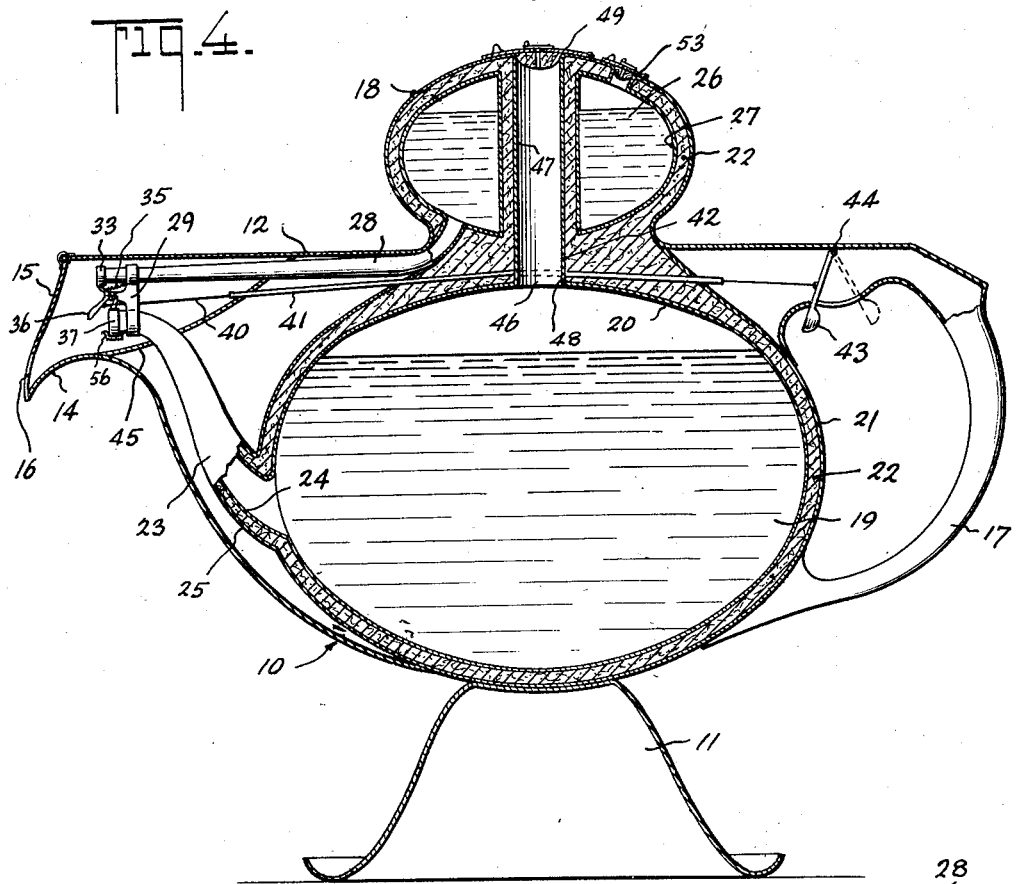
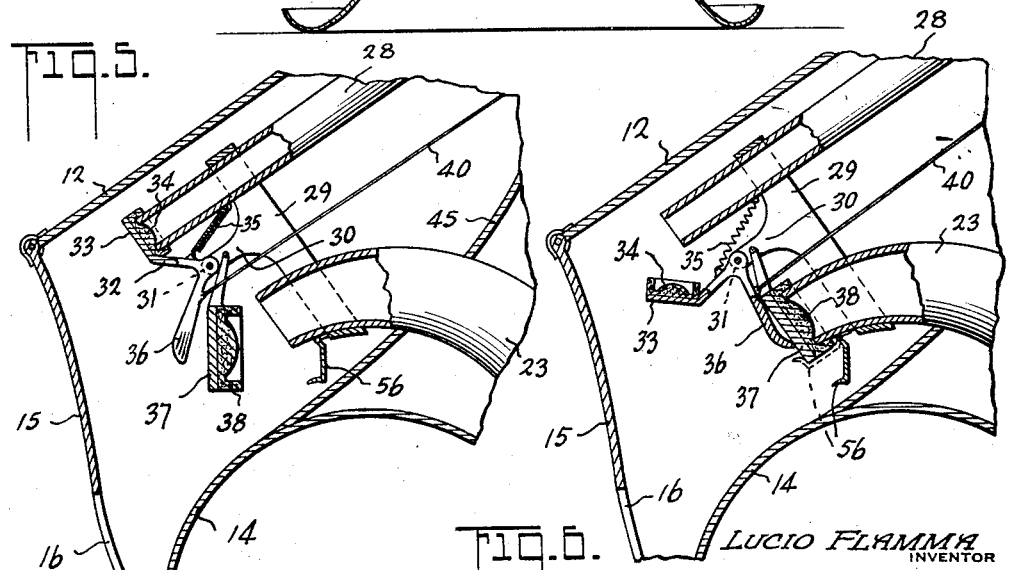

Patented May 26, 1931

1,807,518

UNITED STATES PATENT OFFICE

LUCIO FLAMMA, OF NEW YORK, N. Y.

COMBINATION BEVERAGE DISPENSER

Application filed May 31, 1930. Serial No. 458,232.

This invention relates to combination beverage dispensers and more particularly to a combination beverage dispenser in the form of an urn or the like, especially suitable for table use, which is adapted to dispense a plurality of liquids, either singly or together, as may be desired, the device being particularly adapted for dispensing coffee and cream or milk, tea and cream or milk, cocoa and cream or milk and the like.

The primary object of the present invention is to enable a plurality of liquids, for instance two liquids, to be kept in separate compartments within a single container, the construction being such that both liquids can be kept at different temperatures for short or long periods of time.

Another object is to construct the combination dispenser so that a plurality of containers are provided each insulated from each other as well as from the surrounding atmosphere, one of the compartments being superimposed upon the other, access to the lower compartment being afforded through the upper compartment, and the passage through the upper compartment being insulated against transmission of a different temperature to the contents of the upper compartment.

Still another object of the invention is to provide a unitary casing for both containers, this casing having a spout through which one or both of the beverages or liquids may be dispensed either singly or together.

A further object is to provide means whereby the outlets of both containers will both be normally sealed to prevent changes in temperature of the different liquids.

A still further object is to provide a combination beverage dispenser especially adapted for dispensing coffee and cream or milk, the coffee being maintained in a hot condition while the milk or cream is maintained in a cold condition.

Yet another object is to provide a closure for the upper, or cream container, which closure is constantly held in its closed condition so that liquid may not unintentionally escape from the upper compartment while the lower compartment is in use.

Still another object is to provide a swingable closure member for the outlet of the lower or coffee container which swingable closure operates as a pendulum so that the swingable closure will automatically open when the container is tilted for pouring out the contents of the lower container.

Still another object is to provide manually operated means for opening the closure for the spout or outlet of the upper container when desired, the operation of such manual closure operating means serving to automatically close, and maintain closed, the closure for the outlet of the lower container when the contents of the upper container are to be discharged.

A still further object is to provide means whereby the closure for the outlet of the lower container may be tightly, hermetically closed, and held closed, as for instance when it is desired to keep the contents tightly sealed for a considerable period of time.

A further object is to equip each container with a filling opening, these filling openings each having one or more apertures therein for admission of air to the upper part of each container so that the contents may be readily discharged when desired; and it is another object to provide adjustable means to close said air admission apertures when it is desired to hermetically seal the containers.

Yet another object of the invention is to provide a handy, convenient and valuable combination beverage dispenser which has a wide range of use and which may be manufactured at low cost considering the many advantages incorporated in the dispenser.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a top plan view of the combination beverage dispenser, partially in section.

Fig. 2 is a side elevation of the dispenser.

Fig. 3 is a detail perspective view of a portion of the cover for the inlet or filling opening for the lower container showing the closure for the air admission apertures in said cover.

Fig. 4 is a vertical sectional view through the dispenser as shown in Fig. 2.

Fig. 5 is an enlarged detail sectional view showing the dispenser spout in position for discharge of liquid from the lower compartment only; and Fig. 6 is a view similar to Fig. 5 showing the device in position for discharge of liquid from the upper compartment only.

Referring more particularly to the drawings the combination beverage dispenser in the present instance is especially designed for dispensing a hot beverage and a cold beverage, such as coffee and cream or milk. The dispenser 10 in this instance includes a base or standard 11 which may be of any suitable construction; and on this base or standard 11 is supported an outer casing 12, this outer casing 12 being formed as an elongated body having a rounded central portion 13, a spout portion 14, this spout portion 14 having a spring hinged door 15 provided with a discharge opening 16, the door 15 being normally held closed by a suitable spring means, and being displaceable for a purpose, hereinafter set forth. The outer casing 12 is also equipped with a suitable handle 17 which may be of any suitable form. The casing 12 also includes an upper portion 18.

The outer casing 12 including the rounded body portion 13, spout portion 14 and upper portion 18, is hollow, and within the rounded body portion 13 there is provided a container 19 having double walls 20 and 21, the space between which walls 20 and 21 is preferably filled with suitable heat insulating material 22. The lower container 19 is equipped with an outlet or spout 23 which also has double insulated walls 24 and 25 respectively. The casing wall 18 in this instance encloses an upper container 26, the container 26 having an inner wall 27 which is insulated from the outer wall 18 by insulating material as seen at 22. This upper container 26 has an outlet passage or spout 28, also preferably insulated against heat transference.

The outlet 28 for the upper container and the outlet 23 for the lower container terminate adjacent to each other within the spout portion 14 of the outer casing 12; and means are provided to permit discharge of the liquids one at a time, or together, into the spout 14 and out through the discharge opening 16.

Closure means are provided for the respective outlets 23 and 28, these closure means being adapted to normally seal both outlets and being arranged to permit discharge of liquid from one spout or the other, or both spouts simultaneously. In this instance a bracket 29 is provided near the end portions of the outlets 23 and 28, this bracket 29 being secured to both outlets and in addition to its other purposes as will be described serving to jointly maintain the outlets in properly spaced supporting relation. In this instance the bracket 29 has a forward extension 30 upon which, as seen at 31, there is pivotally mounted an arm 32 carrying a closure member 33 for the open end of the outlet 28, suitable resilient material 34 as for instance soft rubber, being provided so that the open end of the outlet 28 will be normally tightly sealed, and the closure 33 being held tightly in position by means of a coiled spring 35 one end of which is secured to the bracket 29 and the opposite end to the arm 32. A downwardly and angularly extending arm 36 is provided integral with the arm 32, the purpose of which will presently appear.

The outlet 23 normally has its opened or discharge end closed by means of a swingable closure member 37 which in its essential aspects is similar to the closure member 33, being adapted to close the open end of the outlet 23 and for this purpose having suitable resilient cushioning material 38 as in the case of the closure 33. In this instance however the closure 37 is pivotally mounted on the forwardly extending bracket portion 30 as indicated at 39, so that when the dispenser is in the position shown in Fig. 4 the closure will normally remain in position to close the outlet 23.

When it is desired to discharge liquid from the lower container 19 the dispenser is tilted to the position shown in Fig. 5. The closure 37 will then swing away from the outlet 23 so that liquid may be poured from the outlet 23 into the spout 14 and thence out through the discharge opening 16 into the cup or other vessel. The closure member 37 is preferably weighted so that it will readily swing toward and away from the outlet 23 with a pendulum effect.

In this instance means are provided to effectively seal the outlet 23 when it is desired to dispense liquid from the upper container 26. In this instance a flexible cable 40, of wire or other material is connected to the arm 36 beneath the pivot 31, and this cable extends through a tube or conduit 41 within the outer casing 12 and around the neck portion 42 thereof, and the opposite end of this flexible cable 40 is connected to a lever 43 pivotally mounted adjacent to the handle 17 as indicated at 44. When it is desired to discharge liquid from the upper container the lever 43 is drawn outward by one of the user's fingers. This causes the arms 36 and 32 to swing about the pivot 31, causing the closure 33 to move away from the outlet 28. This movement of the arm 36 also causes this arm 36 to engage the closure 37 and hold the same tightly in place over the end of the outlet 23 as seen in Fig. 6. The dispenser may then be tilted and only liquid from the outlet 28 of the upper container 26 can be discharged through the spout opening 16.

When it is desired to allow liquid from both containers to be discharged simultaneously the lever 43 is only drawn back far enough to withdraw the closure 33 from the opening of the outlet 28. The arm 36 will then not descend far enough to effect complete closing of the outlet 23, since the weight of the closure member 37 will cause it to move away from the outlet 23. In this position liquid can be discharged from both outlets 23 and 28 simultaneously.

A partition plate 45 is provided at the rear of the spout 14 so that no liquid can return to the interior of the casing 12. The partition plate 45 is preferably inclined so that any liquid within the spout 14 will be discharged through the opening 16 even when the dispenser is in an upright position. The points where the outlets 28 and 23 and the conduit 41 extend through the partition plate 45 are preferably soldered.

Liquid is admitted to the lower container 19 in the present instance through a passage 46 having double walls 47 and 48 which are separated by insulating material 22, this doubled wall passage 46 extending vertically upward through the upper compartment 26. A hinged cover 49 is provided at the top of the upper casing 18 for the passage 46. This cover in the present instance is provided with a plurality of apertures 50 through which air may be admitted to the upper part of the lower container 19 so that atmospheric pressure will assist in the discharge of the liquid from the container 19. Means are provided to admit a greater or lesser amount of air to the container 19 according to the speed of discharge desired, and for this purpose a supplementary cover 51 is pivotally mounted as seen at 52 so that it may be swung over one or more, or all, of the apertures 50.

The upper container 26 is provided with a hinged cover 53 in all essential aspects similar to the cover 49, and having a swingable closure plate 54 and air admission apertures 55. The lower portions of the covers 49 and 53 are preferably formed of heat insulating material such as cork or the like and preferably extend part way into the passage 46 and double wall of the container 26 respectively.

When it is desired to hermetically seal both containers 19 and 26, as for instance when a hot beverage such as coffee and a cold beverage such as milk or cream are to be kept at as near the initial temperature as possible over night, the closures 51 and 53 are closed to seal the apertures 50 and 55. Means are also provided to tightly seal the outlet 23 of the lower container, it being understood that the closure 33 of the upper container is always normally tightly pressed against the outlet 28 by means of the spring 35. A swingable catch device 56 is mounted beneath the outlet 23 adjacent to its open end. This catch 56 is adapted to grasp the outer side of the closure member 37 as seen in the dotted lines in Fig. 6, with a wedging action which tightly presses the resilient material 38 against the open end of the outlet 23. Access is afforded to the catch 56 by raising the hinged cover 15, whereupon the user may readily insert a finger to grasp the catch and spring it over the outer side of the closure 37. The catch 56 may be released in the same manner when desired.

It will thus be seen that I have provided a very handy and convenient arrangement in which two liquids such as coffee and cream may be kept at their different proper temperatures for a considerable period of time, the liquids being dischargeable as desired separately or together through the simple manipulation of the single lever 43. In pouring coffee for instance it is simply necessary to tilt the dispenser whereupon the closure member 37 will remove itself from the outlet 23 and the coffee will be discharged. When a suitable amount of coffee has been dispensed the lever 43 is manipulated to discharge the cream; and when a sufficient amount of cream has been discharged the lever 43 is simply released and the dispenser returned to an upright position.

The present combination beverage dispenser eliminates waste from spilling, unnecessary use of separate cream pitchers and the like thus saving energy, space and materials besides being very hygienic inasmuch as neither the cream nor the coffee are in contact with the atmosphere. The use of the present device enables coffee for instance to be prepared a considerable time before it is desired to use the same which will be found to be a great saving particularly in restaurants, hotels, on trains, steamships and the like.

The hereinbefore described constructions admit of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What I claim is:

1. A combination beverage dispenser including an outer casing, a heat insulated double walled container at the lower part of said casing, a second heat insulated double walled container at the upper part of said casing, said casing including a pouring spout and a handle, an outlet conduit leading from said upper container to said spout, a second outlet conduit leading from said lower container to said spout, closure means to normally close the outer ends of said conduits, said closure means including a bracket supported by said conduits, an arm pivotally mounted on said bracket, a closure member rigidly mounted on said arm, means to normally hold said closure member against the open end of said upper conduit, a second closure member pivotally mounted on said bracket, said second closure member adapted to normally rest against the open end of said lower conduit, and being adapted to move away from said lower conduit when said casing is tilted to discharge contents of said lower container, and manually operated means to move said upper closure member away from said upper conduit.

2. A combination beverage dispenser including a hollow casing, a container at the lower part of said casing, a second container at the upper part of said casing, said casing including a pouring spout and a handle, an outlet conduit leading from said upper container to said spout, a second outlet conduit leading from said lower container to said spout, means to normally close the outer ends of said conduits, said closure means including a bracket mounted on said conduits, an arm pivotally mounted on said bracket, a closure member rigidly mounted on said arm, means to normally hold said closure member against the open end of said upper conduit, a swingable weighted closure member mounted on said bracket, said swingable closure member adapted to normally rest against the open end of said lower conduit, said swingable closure member being adapted to move away from said lower conduit when said casing is tilted to discharge contents of said lower container, manually operated means to move said upper closure member away from said upper conduit, and a finger on said arm adapted to engage said swingable closure member and hold the same against the end of said lower conduit during operation of said manually operated means.

3. A combination beverage dispenser including a hollow casing, a container at the lower part of said casing, a second container at the upper part of said casing, said casing including a pouring spout and a handle, a hinged door at said pouring spout, said door having a discharge opening for said spout, an outlet conduit leading from said upper container to said spout, a second outlet conduit leading from said lower container to said spout, closure means for the outer ends of each of said conduits, means to normally hold the closure member for said upper conduit against the open end of said upper conduit, a pivotal mounting for the closure member of said lower conduit, said pivotally mounted closure member for the lower conduit being adapted to move away from said lower conduit when said casing is tilted to discharge contents of said lower container, manually operated means to operate both said closure members, and a supplementary latch device on said lower conduit to hold said swingable closure member tightly in place against the end of said lower conduit, said supplementary latch device being accessible through said pouring spout.

4. A combination beverage dispenser including a hollow casing, a heat insulated double walled container at the lower part of said casing, a second heat insulated double walled container at the upper part of said casing, said casing including a pouring spout and a handle, an outlet conduit leading from said upper container to said spout, a second outlet conduit leading from said lower container to said spout, closure devices to normally seal the outer ends of said conduits, manually operated means to operate said conduit closure devices, a partition plate in said spout at the rear of the open end portions of said conduits, a heat insulated double walled conduit extending through said upper container and to said lower container, said upper container having a filling aperture, and hinged covers for said filling aperture and said last mentioned double walled conduit.

5. A combination beverage dispenser including a hollow casing, a heat insulated double walled container at the lower part of said casing, a second heat insulated double walled container at the upper part of said casing, said casing including a pouring spout and a handle, an outlet conduit leading from the lower part of said upper container to said spout, a second outlet conduit leading from said lower container to said spout, closure devices to normally seal the outer ends of said conduits manually controlled means to operate said closure devices, a partition plate in said spout at the rear of the open end portions of said conduits, a heat insulated double walled conduit extending through said upper container and to said lower container, said upper container having a filling aperture, hinged covers for said filling aperture and said last mentioned double walled conduit, said hinged covers each having a plurality of air admission apertures, and a swingable closure plate on each of said covers for sealing said air admission apertures.

6. A combination beverage dispenser including a hollow casing, a heat insulated double walled container at the lower part of said casing, a second heat insulated double walled container at the upper part of said casing, said casing including a pouring spout and a handle, an outlet conduit leading from said upper container to said spout, a second outlet conduit leading from said lower container to said spout, means to normally close the outer ends of said conduits, said closure means including a bracket secured to the end portions of said conduits, an arm pivotally mounted on said bracket; a closure member rigidly mounted on said arm, means to normally hold said closure member against the open end of said upper conduit, a swingable, weighted closure member mounted on said bracket, said swingable closure member adapted to normally rest against the open end of said lower conduit, said swingable closure member being adapted to move away from said lower conduit when said casing is tilted to discharge contents of said lower container, manually operated means to move said upper closure member away from said upper conduit, a finger on said arm adapted to engage said swingable closure member and hold the same against the end of said lower conduit during operation of said manually operated means, said manually operated means including a cable secured to said arm and a trigger pivotally mounted adjacent to said handle, a partition plate in said spout at the rear of the open end portions of said conduits, a heat insulated double walled conduit extending through said upper container and to said lower container, said upper container having a filling aperture, hinged covers for said filling aperture and said last mentioned double walled conduit, said hinged covers each having a plurality of air admission apertures, and a swingable closure plate on each of said covers for sealing said air admission apertures.

7. A combination beverage dispenser including a hollow casing, a heat insulated double walled container at the lower part of said casing, a second heat insulated double walled container at the upper part of said casing, said casing including a pouring spout and a handle, a hinged door at said pouring spout, said door having a discharge opening for said spout, an outlet conduit leading from the lower part of said upper container to said spout, a second outlet conduit leading from said lower container to said spout, means to normally close the outer ends of said conduits, said closure means including a bracket secured to the end portions of said conduits, an arm pivotally mounted on said bracket; a closure member rigidly mounted on said arm, means to normally hold said closure member against the open end of said upper conduit, a swingable weighted closure member mounted on said bracket, said swingable closure member adapted to normally rest against the open end of said lower conduit, said swingable closure member being adapted to move away from said lower conduit during tilting of said casing to discharge contents of said lower container, manually operated means to move said upper closure member away from said upper conduit, a finger on said arm adapted to engage said swingable closure member and hold the same against the end of said lower conduit during operation of said manually operated means, a supplementary latch device on said lower conduit to hold said swingable closure member tightly in place against the end of said lower conduit, said manually operated means including a cable secured to said arm and a trigger pivotally mounted adjacent to said handle, a partition plate in said spout at the rear of the open end portions of said conduits, a heat insulated double walled conduit extending through said upper container and to said lower container, said upper container having a filling aperture, hinged covers for said filling aperture and said last mentioned double walled conduit, said hinged covers each having a plurality of air admission apertures, and a swingable closure plate on each of said covers for sealing said air admission apertures.

In testimony whereof I hereby affix my signature.

LUCIO FLAMMA.